United States Patent Office 3,206,464
Patented Sept. 14, 1965

---

3,206,464
**4,5-BIS(AMINOMETHYL)-3-HALO-2-
METHYLPYRIDINE**
Shreekrishna Manmohan Gadekar, Valley Cottage, N.Y.,
assignor to American Cyanamid Company, Stamford,
Conn., a corporation of Maine
No Drawing. Filed May 14, 1962, Ser. No. 194,683
2 Claims. (Cl. 260—296)

This invention relates to new 4,5-bis-(aminomethyl)-3-halo-2-methylpyridines of the formula:

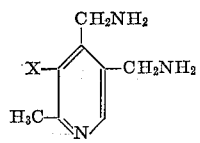

wherein X is halogen, and the non-toxic acid addition salts thereof.

The novel compounds are low melting solids which, having basic properties, are conveniently prepared in the form of their acid addition salts, ordinarily the tri-basic acid addition salts. The salts are characteristically soluble in water, somewhat less soluble in polar solvents such as methanol and ethanol, and relatively insoluble in non-polar solvents such as benzene, ether, petroleum ether, and the like.

The compounds of the invention are central nervous system depressants. In particular, they show depressant action of the tranquilizer-muscle relaxant type, and show good activity at non-toxic doses.

This activity is demonstrated in several ways. A useful tranquilizer test consists of measuring the reduction of spontaneous motor activity in animals. For example, the active compounds of this invention are administered intraperitoneally at graded dose levels to groups of five mice. At the time of peak effect, each group of mice is placed in an actophotometer (photoelectric device for quantitatively measuring locomotor activity) for a period of five minutes. Parallel control groups of five mice are given starch vehicle and their activity is also determined in a similar fashion. The average motor activity of the treated and control groups is compared and the percent reduction of motor activity due to the active agent is calculated. If desired, the dose which produces a 50% reduction in motor activity may also be calculated from the results of several different dose levels. The use of reduced motor activity as a measurer of tranquilizing activity has been described by W. D. Gray, A. C. Osterberg and C. E. Rauh, Archives Internationales de Pharmacodynamie et de Therapie, vol. 134, p. 198 (1961), and by W. J. Kinnard and C. J. Carr, Journal of Pharmacology and Experimental Therapeutics, vol. 121, p. 354 (1957).

A test which is designed to demonstrate muscle relaxant properties consists of measuring the ability of animals to remain on an inclined screen. Groups of ten mice or rats are given intraperitoneal doses of the new agent at three or more graded dose levels. The animals are placed on a ¼ inch wire mesh screen inclined at a 60° angle immediately after receiving the agent being studied. This is a modification of the method reported by M. G. Allmark and W. M. Bachinski, Journal of the American Pharmaceutical Association, vol. 38, p. 43 (1949). The animals are observed for 20 minutes or longer and the proportions of animals falling off the screen at each dose level are recorded. The dose which produces this effect to 50% of the animals is calculated ($IS_{50}$). The use of an inclined screen test as a measure of muscle relaxant activity has been described by L. O. Randall, Diseases of the Nervous System, vol. 21 (March Supplement), p. 7 (1960). When new compounds of this invention are tested in mice as described above they show good muscle relaxant activity at non-toxic doses.

The compounds of this invention may be used in the form of their free bases or as the non-toxic acid addition salts such as the hydrochloride, sulfate, phosphate, etc. The compounds may be administered orally and when so administered are central nervous system depressants at individual doses ranging from about 25 to 200 milligrams. The dosage regimen can be adjusted to provide the optimum therapeutic response. For example, several doses may be administered daily, or the dose may be proportionately reduced as indicated by the exigencies of the therapeutic situation.

For therapeutic administration the new compounds may be incorporated with pharmaceutical excipients and used, for instance, in the form of tablets, dragées, capsules, suppositories, liquids to be administered in drops, emulsions, suspensions, sirups, chocolate, candy, chewing gum, and the like. Such compositions and preparations should contain at least 0.1% of the active ingredient. The percentage in the compositions and preparations may, of course, be varied and may conveniently be between 2% and about 60% or more of the weight of the unit. The amount of active ingredient in such therapeutically useful compositions or preparations is such that a suitable dosage will be obtained. Preferred compositions or preparations according to the present invention are prepared in such a manner that an oral dosage unit form contains between about 25 milligrams and about 200 milligrams of the novel compound.

Tablets, pills, dragées, and the like usually contain the following: A binder such as gum tragacanth, acacia, corn starch or gelatin. A disintegrating agent such as corn starch, potato starch, alginic acid, or the like. A lubricant such as stearic acid, magnesium stearate, talc, or the like. A sweetening agent such as sucaryl or saccharin may be added, as well as flavoring such as peppermint, oil of wintergreen, or cherry flavoring.

The compounds of this invention may be prepared from 3-amino-4,5-bis(aminomethyl)-2-methylpyridine [J.A.C.S. 65, 954 (1943)] by means of three conventional chemical transformations:

(1) The starting material is treated with ethylchlorocarbonate in acylating conditions such as the Schotten-Baumann technique to yield 3-amino-4,5-bis(carbethoxyaminomethyl)-2-methylpyridine.

(2) The latter intermediate is halogenated by means of the Sandemeyer technique to yield the corresponding 3-halo-4,5-bis-(carbethoxyaminomethyl)-2-methylpyridine.

(3) The latter 3-halo intermediates may then be hydrolyzed by conventional methods to yield the desired 4,5-bis-(aminomethyl)-3-halo-2-methylpyridine.

The invention will be described in greater detail in conjunction with the following specific examples.

EXAMPLE 1

*Preparation of 3-amino-4,5-bis-(carbethoxyaminomethyl)-2-methylpyridine*

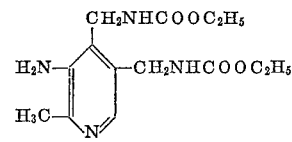

A solution of 55.1 g. (.200 mole) of 3-amino-4,5-bis(aminomethyl)-2-methylpyridine trihydrochloride in 200 ml. of water is treated with 120 ml. of 5 N sodium hydroxide and the resultant light yellow solution is cooled to about 8–10°. With stirring, this solution is treated gradually with 43.4 g. (0.400 mole) of ethylchlorocarbonate, simultaneously adding 80 ml. of 5 N sodium hydroxide to maintain the reaction mixture slightly on the alkaline side. After completing the addition of chlorocarbonate and alkali, the cooling bath is removed and the reaction is allowed to come to room temperature. A copious white precipitate that forms is recooled in an ice bath and then filtered off, washed with cold water, and dried in an oven; wt. 42.3 g. (68%), melting point 190–191° C. A 1 g. sample of the crude material crystallized from ethanol affords 0.7 g. (70%) of silky needles melting at 195–196°.

EXAMPLE 2

*Preparation of 3-chloro-4,5-bis-(carbethoxyaminomethyl)-2-methylpyridine*

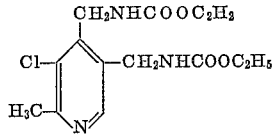

To a solution of 16 g. (0.52 mole) of 4,5-bis(carbethoxyaminomethyl)-3-amino-2-methylpyridine in 40 ml. of concentrated hydrochloric acid and 30 ml. of water is added a warm solution of 22 g. (0.083 mole) of copper sulfate pentahydrate in 40 ml. of water. The mixture is cooled to —2° in a salt-ice bath and a solution of 6.3 g. (0.093 mole) of sodium nitrate in 25 ml. of water is added dropwise with stirring over a period of one hour. The mixture is allowed to come to room temperature and is then warmed to 50° until evolution of nitrogen ceases. After saturating with hydrogen sulfide, the copper sulfide is filtered off and the clear filtrate chilled and made basic with 5% sodium bicarbonate, yielding a tacky solid. A crystalline product is obtained by redissolving this solid in hydrochloric acid (decolorizing charcoal) and reprecipitating with sodium hydroxide; yield, 16 g. (93%), melting point 102–106°. Recrystallization from 30% ethanol gives a white crystalline solid; yield, 5.8 g. (34%); melting point 114—114.5° C. after drying.

EXAMPLE 3

*Preparation of 4,5-bis(aminomethyl)-3-chloro-2-methyl pyridine trihydrochloride*

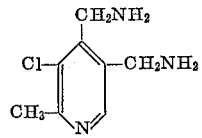

A solution of 3.3 g. (0.010 mole) of 4,5-bis(carbethoxyaminomethyl-3-chloro-2-methylpyridine in 50 ml. of concentrated hydrochloric acid is heated over a steam bath for 48 hours and evaporated in vacuo to dryness. The solid is triturated with 15 ml. of ethanol and the product is filtered off; yield, 2.8 g. (95%); melting point 290–292° C. (dec. with darkening above 250°).

Recrystallization of 300 mg. of this material from 5 ml. of ethanol, 1 ml. of water and decolorizing charcoal, and addition of 1 ml. of alcoholic hydrogen chloride gives a yellow precipitate which is air dried; yield, 200 mg. (67.8%); melting point 292–295°C. (dec. with darkening above 235°).

In a similar manner the corresponding bromo- and iodo-substituted methylpyridines can be prepared.

EXAMPLE 4

| Per Tablet, gram | | For 10,000 Tablets, gram |
|---|---|---|
| 0.200 | Active ingredient: 4,5-bis-(aminomethyl)-3-chloro-2-methyl-pyridine. | 2,000 |
| 0.015 | Corn starch (for mix). | 150 |
| 0.015 | Corn starch (for paste). | 150 |
| 0.020 | Alginic acid. | 200 |
| 0.005 | Methocel (400 centipoises). | 50 |
| 0.255 | | 2,550 |
| 0.003 | Magnesium Stearate (1%). | 30 |
| 0.258 | | 2,580 |

The active ingredient, corn starch (for mix) alginic acid, and methocel are blended together. The corn starch (for paste) is suspended in 600 milliliters of water and heated, with stirring to form a paste. This paste is then used to granulate the mixed powders. Additional water is used, if necessary. The wet granules are passed through a No. 8 hand screen and dried at 120°F. The dry grandules are then passed through a No. 16 screen. The mixture is lubricated with 1% magnesium stearate and compressed into tablets in a suitable tableting machine.

I claim:

1. A compound selected from the group consisting of 4,5 - bis(aminomethyl)-3-halo-2-methylpyridines of the formula:

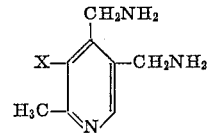

wherein X is halogen and the non-toxic acid addition salts thereof.

2. 4,5-bis(aminomethyl)-3-chloro-2-methylpyridine.

References Cited by the Examiner

UNITED STATES PATENTS

| 2,410,531 | 11/46 | Szabo | 260—297.5 |
| 2,788,348 | 4/57 | Dorf et al. | 260—297.5 |
| 2,937,118 | 5/60 | Haxthausen et al. | 167—65 |
| 3,041,346 | 6/62 | Kober et al. | 260—296 |
| 3,050,525 | 8/62 | Bicking | 260—296 |
| 3,060,090 | 10/62 | Becker | 167—65 |

WALTER A. MODANCE, *Primary Examiner.*

DUVAL T. McCUTCHEN, *Examiner.*